United States Patent [19]
Woodard

[11] Patent Number: 5,632,805
[45] Date of Patent: May 27, 1997

[54] SEMIPERMEABLE MEMBRANE DRYER FOR AIR COMPRESSOR SYSTEM

[75] Inventor: Michael K. Woodard, Hampton, Va.

[73] Assignee: Newport News Shipbuilding and Dry Dock Company, Newport News, Va.

[21] Appl. No.: 463,576

[22] Filed: Jun. 5, 1995

[51] Int. Cl.⁶ .................................................. B01D 53/22
[52] U.S. Cl. ........................................ 96/4; 95/52; 96/8
[58] Field of Search .......................... 95/39, 52; 96/4, 96/7–14; 417/106, 245, 251

[56] References Cited

U.S. PATENT DOCUMENTS

| | | | |
|---|---|---|---|
| Re. 33,678 | 9/1991 | Campbell et al. | 95/52 X |
| 4,180,552 | 12/1979 | Graham et al. | 96/8 X |
| 4,180,553 | 12/1979 | Null et al. | 96/8 X |
| 4,264,338 | 4/1981 | Null | 95/52 X |
| 4,718,921 | 1/1988 | Makino et al. | 95/52 |
| 4,931,070 | 6/1990 | Prasad | 95/52 |
| 4,994,094 | 2/1991 | Behling et al. | 95/39 |
| 5,002,590 | 3/1991 | Friesen et al. | 95/52 |
| 5,082,481 | 1/1992 | Barchas et al. | 95/51 X |

*Primary Examiner*—Robert Spitzer
*Attorney, Agent, or Firm*—C. N. Rosen

[57] ABSTRACT

An improved system for producing dry, high pressure air uses a semipermeable membrane dehydrator to remove water vapor from compressed air between two stages of compression in a multistage air compressor.

10 Claims, 4 Drawing Sheets

SEMIPERMEABLE MEMBRANE DRYER FOR AIR COMPRESSOR SYSTEM

BACKGROUND OF THE INVENTION

1. Field of the Invention

This invention relates generally to improvements in air compressors, and more particularly to a method and apparatus for intermediate stage dehydration in a multistage air compressor using a membrane type dehydrator. This invention is more reliable and environmentally friendly than conventional compressor/dryer systems which use mechanical chillers, moisture separators, drain systems, and desiccant type dehydrators because it requires no moving parts, no electrical heating supply, no desiccants which cause downstream contamination, and no CFC's. Because of these features it also requires less maintenance.

2. Description of the Prior Art

The amount of moisture contained in free air is dependent on the temperature and pressure of the air. As air is compressed, the moisture holding capacity is reduced when the volume is reduced if the temperature is held constant. However, as air is compressed, the temperature increases, thereby increasing the moisture-holding capacity. This increased air temperature is in itself generally undesirable for most compressed air applications. Also, the temperature of areas downstream may be lower than that of the moisture-laden compressed air, and condensation results which is generally undesirable. In most instances, heat exchangers (aftercoolers) are used to lower the temperature of the air after each stage of compression. By lowering the temperature, some moisture in the form of liquid condensate is removed from the air. The liquid contaminants in most compressed air systems are water and oil, or an emulsified combination of the two. These are removed by mechanical means such as moisture separators or coalescing filters. However, compressed air is still laden with water vapor which is not easily removed by mechanical means but is best removed by the process known as air drying.

In the prior art the three commonly used methods of air drying are (1) absorbent (deliquescent desiccant), (2) adsorbent (regenerative desiccant), and (3) refrigeration (mechanical refrigerated cooling). Each of these methods has advantages and disadvantages. Deliquescent dryers have no moving parts and low initial cost. However, deliquescent dryers have limited dew point suppression; 20° to 30° F. is common. They also have high maintenance, requiring periodic replacement of the desiccant, and they must be manually drained regularly. Dryers using regenerative desiccants on the other hand are able to achieve low dew points, to −100° F., but have high initial cost, high operating cost, and require periodic servicing of desiccant towers. Refrigeration dryers have low maintenance and low operating cost, but cannot produce low dew points. Dew points are limited to 38° F. as a minimum to prevent freezeup. Refrigeration-type dryers are commonly used as a first step dryer ahead of desiccant type dryers.

A fourth type of dryer has been developed based on the use of semipermeable membranes. Semipermeable membranes have long been employed in gas separation operations. Gases pass through the membrane by a combination of diffusion through the pores linking the surfaces of the membrane and permeation through the material of the membrane. The driving force for the separation process is the difference between the partial pressure of a gas on one side of the membrane, and the partial pressure of a gas on the other side of the membrane. When gaseous mixtures are compressed, the partial pressures of the various gas components increase. In the case of compressed air, the partial pressure of the water vapor will be equal to the saturation pressure at the corresponding temperature of the gaseous mixture. When the compressed air is cooled, the partial pressure of the water vapor in the duty air stream could be lower than the surrounding air. Therefore, the driving force for separation of water vapor from compressed air is achieved by lowering the partial pressure of the water vapor on the outside of the membranes. This is done by encasing the membranes in a shell which functions as a conduit to transport the permeated water vapor and as a barrier to separate the membranes from the wet atmospheric air. A dry carrier gas is produced which is used to purge the atmospheric air from the inside of the shell and as "sweep air" to carry water vapor away from the membrane. The sweep air and water vapor are continuously vented from the shell of the dryer.

New developments in membrane fabrication and packaging techniques have made membrane technology attractive for large scale high pressure air drying. A semipermeable membrane has been developed which has a design pressure limit of 1000 psig. We have discovered a way to incorporate this new membrane in a high pressure air compressor system.

SUMMARY OF THE PRESENT INVENTION

The present invention incorporates the advantages of membrane type dryers while overcoming their disadvantages to produce dry compressed air at much higher pressures than previously possible. The present invention overcomes the pressure limits of previous applications of membrane technology by integrating a membrane dryer into a multistage compressor. This novel method of interstage dehydration has low maintenance, produces extremely low dew points, and eliminates moisture separation and drain components on compression stages downstream of the membrane dehydrator. When employed as described herein, no further dehydration equipment is required after compression.

To overcome the pressure limitations of membrane air dryer technology, the present invention is directed to multistage high pressure air compressors. At the intermediate stages of compression, the discharge pressure is lower than the design pressure limit of semipermeable membrane. For example, at the third stage of compression in a five stage compressor, the discharge pressure does not exceed this design pressure limit. By integrating the membrane dryer into the compressor at this stage, the dew point of discharge air is significantly lower than in conventional compressors. The result is very dry high pressure air ready for use as required.

DETAILED DESCRIPTION OF THE INVENTION

Figure 1:
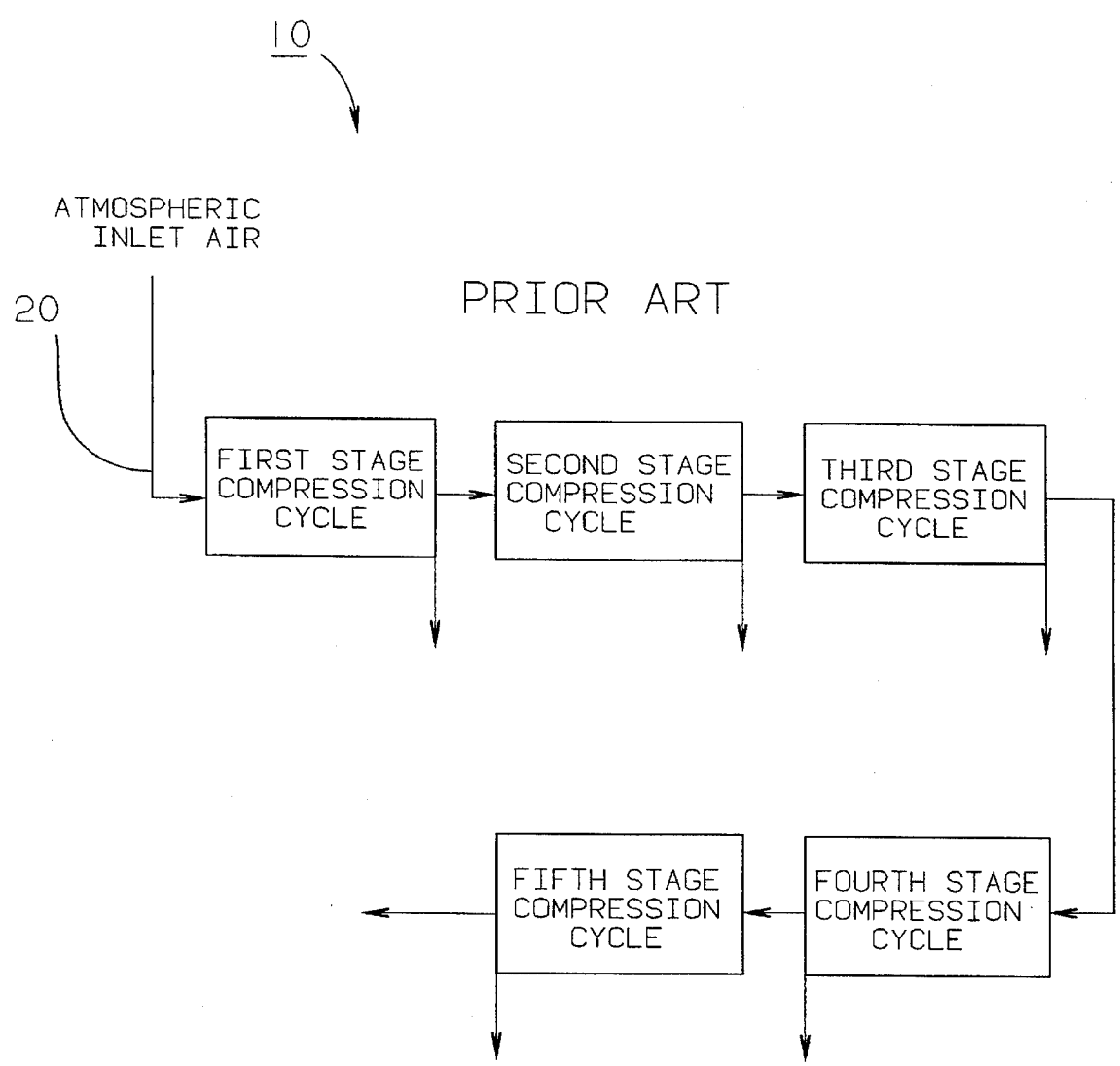
FIG. 1 is a block diagram of a prior art conventional multistage high pressure air compressor system.

Referring to the drawings, and particularly FIG. 1, a block diagram of a typical prior art multistage high pressure air compressor system is referred to generally as 10. Atmospheric inlet air 20 is brought into the high pressure air compressor system 10 where it is compressed in five stages as follows:

1st stage 0 to 52 psig @ 70° F.
2nd stage 52 to 175 psig @ 118° F.
3rd stage 175 to 585 psig @ 108° F.
4th stage 585 to 1580 psig @ 104° F.
5th stage 1580 to 4200 psig @ 105° F.

Figure 2:
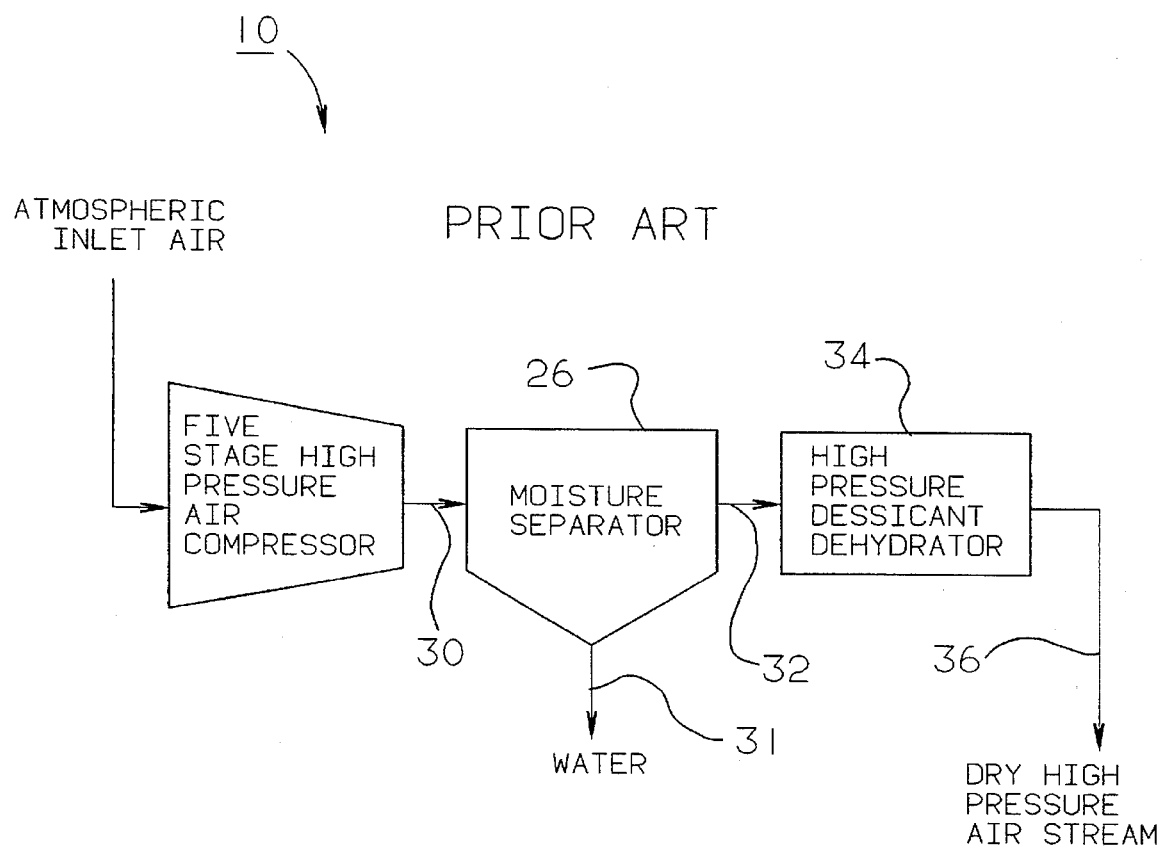
FIG. 2 is a block diagram of a typical prior art multistage high pressure air dehydration system.

Referring to FIG. 2, conventional high pressure air compressor system 10 is further detailed to show how the output air 30 is dried or dehydrated. Entrained water droplets are removed from the duty air stream 30 by a moisture separator 26 and discharged through conduit 31 to a drain system (not shown). Duty air stream 30 is then discharged through conduit 32 to high pressure dehydrator 34 for moisture removal. Dry high pressure air 36 is discharged from dehydrator 34 for use as required.

Figure 3:
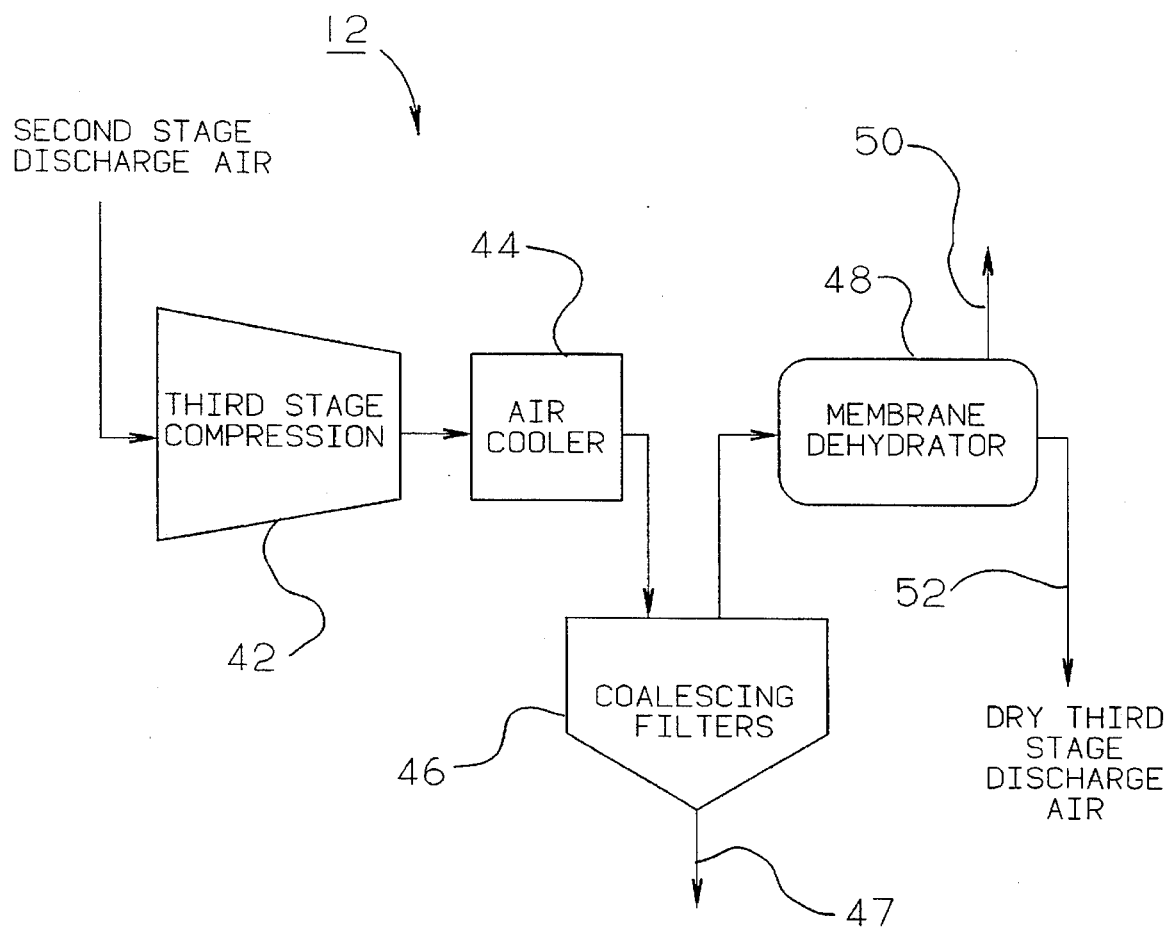
FIG. 3 is a block diagram of the third stage compression cycle of the present invention.

The improvement of the present invention, shown generally as 12 in FIG. 3, includes a modified compression cycle, wherein at least one stage, preferably the third stage of compression 42 includes air cooler 44, coalescing filters 46, and a semipermeable membrane dehydrator 48. Air cooler 44 cools the compression discharge duty air stream by conventional means prior to coalescing filters 46. Coalescing filters 46 remove entrained water droplets and any particulate matter 47 by conventional means from the compression discharge duty air stream prior to membrane dehydrator 48. The air pressure and temperature of third stage compression discharge air stream is low enough, 585 psig at 104° F. for example, to be fed to membrane dehydrator 48, which has a maximum tolerable pressure differential of 1000 psig.

Membrane dehydrator 48 removes water vapor 50 from the duty air stream by the permeation process described earlier. The output of this third stage compression, cooling, filtering and dehydrating is air 52 at a nominal 585 psig, temperature 104° F., and dew point −20° F.

Figure 4:
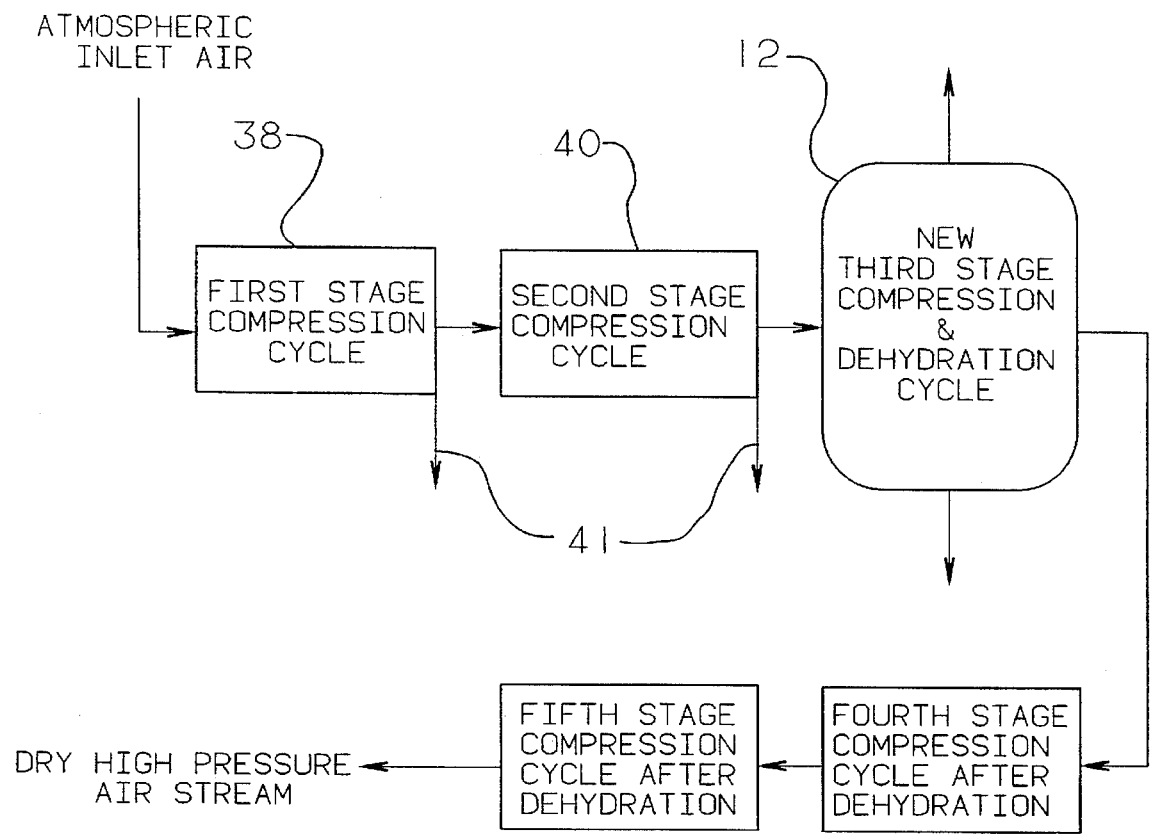
FIG. 4 is a block diagram of a multistage high pressure air compressor of the present invention.

We have determined that whereas the prior art has taught that it is necessary to dehydrate the air after the final stage of a five stage air compression system, the output of this third stage compression, cooling, filtering and semipermeable membrane dehydration may be further compressed (and cooled) in two stages to the desired 4200 psig at 105° F. with dew point of 5° F. without further dehydration. As shown in FIG. 4, whereas preceding first stage 38 and second stage 40 require removal of water 41, each successive stage of compression, stage four for example, requires only that the temperature of compressed discharge air elevated by compression, be reduced. No further moisture separators, drain systems, or dryers are required to produce very dry high pressure air.

The process of the present invention effectively removes moisture from air during the compression cycle in an economical process. No dryers are required which must be serviced regularly and which may cause problems with equipment downstream. However, permeate losses will generally be higher for membrane dehydration and must be taken into account when sizing the compressor. From the above description, it is evident that changes, adaptations and modifications could be made by those skilled in the art. However, all such variations should be considered to be within the scope of the description, limited solely by the appended claims.

We claim:

1. An improved system for the production of dry, high pressure air comprising:
   a source of wet feed air;
   an air compressor having a plurality of compression stages;
   a means for dehydrating high pressure air;
   said means for dehydrating located between at least two of said plurality of compression stages; and
   said means for dehydrating comprising a semipermeable membrane dehydrator capable of permeating moisture in said wet feed air.

2. An improved system for the production of dry, high pressure air as in claim 1, wherein said semipermeable membrane dehydrator permeates moisture in the form of water vapor.

3. An improved system for the production of dry, high pressure air as in claim 1, further comprising:
   a plurality of coalescing filters for removing water droplets and particulate matter from said wet feed air, said filters being located on the upstream side of said semipermeable membrane dehydrator.

4. An improved system for the production of dry, high pressure air as in claim 3, further including at least one air cooler for receiving compressed air from at least one compression stage of said plurality of compression stages, said at least one air cooler being located upstream of said coalescing filters.

5. An improved system for the production of dry, high pressure air as in claim 1, said semipermeable membrane dehydrator having a design pressure limit, said semipermeable membrane dehydrator being located after a compression stage which produces a discharge duty air stream at a pressure less than said design pressure limit of said semipermeable membrane.

6. An improved system for the production of dry, high pressure air as in claim 5, wherein said design pressure limit of said semipermeable membrane dehydrator is at least 1000 psig.

7. An improved system for the production of dry, high pressure air as in claim 1, wherein said semipermeable membrane dehydrator being located between a third stage and a fourth stage of said plurality of compression stages.

8. An improved system for the production of dry, high pressure air comprising:
   a source of wet feed air;
   an air compressor having a plurality of compression stages;
   a means for dehydrating high pressure air;
   said means for dehydrating located between at least two of said plurality of compression stages, said means for dehydrating comprising a semipermeable membrane dehydrator having a design pressure limit, said semipermeable membrane dehydrator capable of permeating moisture in said wet feed air, said semipermeable membrane dehydrator being located after a compression stage which produces a discharge duty air stream at a pressure less than said design pressure limit of said semipermeable membrane;
   a plurality of coalescing filters for removing water droplets and particulate matter from said wet feed air, said filters being located on the upstream side of said semipermeable membrane dehydrator; and at least one air cooler for receiving compressed air from at least one compression stage of said plurality of compression stages, said at least one air cooler being located upstream of said coalescing filters.

9. An improved system for the production of dry, high pressure air comprising:

a source of wet feed air;

an air compressor having a plurality of compression stages;

a means for dehydrating high pressure air;

said means for dehydrating located between at least two of said plurality of compression stages, said means for dehydrating comprising a semipermeable membrane dehydrator capable of permeating moisture in said wet feed air, said semipermeable membrane dehydrator having a design pressure limit, said semipermeable membrane dehydrator being located after a compression stage which produces a discharge duty air stream at a pressure less than said design pressure limit of said semipermeable membrane, said semipermeable membrane dehydrator being located between a third stage and a fourth stage of said plurality of compression stages;

a plurality of coalescing filters for removing water droplets and particulate matter from said wet feed air, said filters being located on the upstream side of said semipermeable membrane dehydrator; and at least one air cooler for receiving compressed air from at least one compression stage of said plurality of compression stages, said at least one air cooler being located upstream of said coalescing filters.

10. An improved system for the production of dry, high pressure air comprising:

a source of wet feed air;

an air compressor having a plurality of compression stages;

a means for dehydrating high pressure air;

said means for dehydrating located between at least two of said plurality of compression stages, said means for dehydrating comprising a semipermeable membrane dehydrator capable of permeating moisture in said wet feed air, said semipermeable membrane dehydrator having a design pressure limit, said design pressure limit being at least 1000 psig, said semipermeable membrane dehydrator being located after a compression stage which produces a discharge duty air stream at a pressure less than said design pressure limit of said semipermeable membrane;

a plurality of coalescing filters for removing water droplets and particulate matter from said wet feed air, said filters being located on the upstream side of said semipermeable membrane dehydrator; and at least one air cooler for receiving compressed air from at least one compression stage of said plurality of compression stages, said at least one air cooler being located upstream of said coalescing filters.

* * * * *